(No Model.)  2 Sheets—Sheet 1.

B. S. CULLEN.
MACHINE FOR DRYING GRAIN.

No. 299,204. Patented May 27, 1884.

WITNESSES:

INVENTOR:

(No Model.) 2 Sheets—Sheet 2.

B. S. CULLEN.
MACHINE FOR DRYING GRAIN.

No. 299,204. Patented May 27, 1884.

WITNESSES.
H. J. Schneider
Walter S. Dodge

INVENTOR
Bentley S. Cullen,
by Dodgerson,
Associate Attys.

UNITED STATES PATENT OFFICE.

BENTLEY S. CULLEN, OF MANKATO, MINNESOTA.

MACHINE FOR DRYING GRAIN.

SPECIFICATION forming part of Letters Patent No. 299,204, dated May 27, 1884.

Application filed August 18, 1882. (No model.)

*To all whom it may concern:*

Be it known that I, BENTLEY S. CULLEN, a citizen of the United States, residing at Mankato, in the county of Blue Earth, in the State of Minnesota, have invented a new and useful Machine for the Drying of Grain and other Substances, of which the following is a specification.

My invention relates to grain-drying apparatus; and it consists in making the suspending devices adjustable, in order to vary the inclination of the pan or pans, and in other features hereinafter pointed out.

Figure 1:
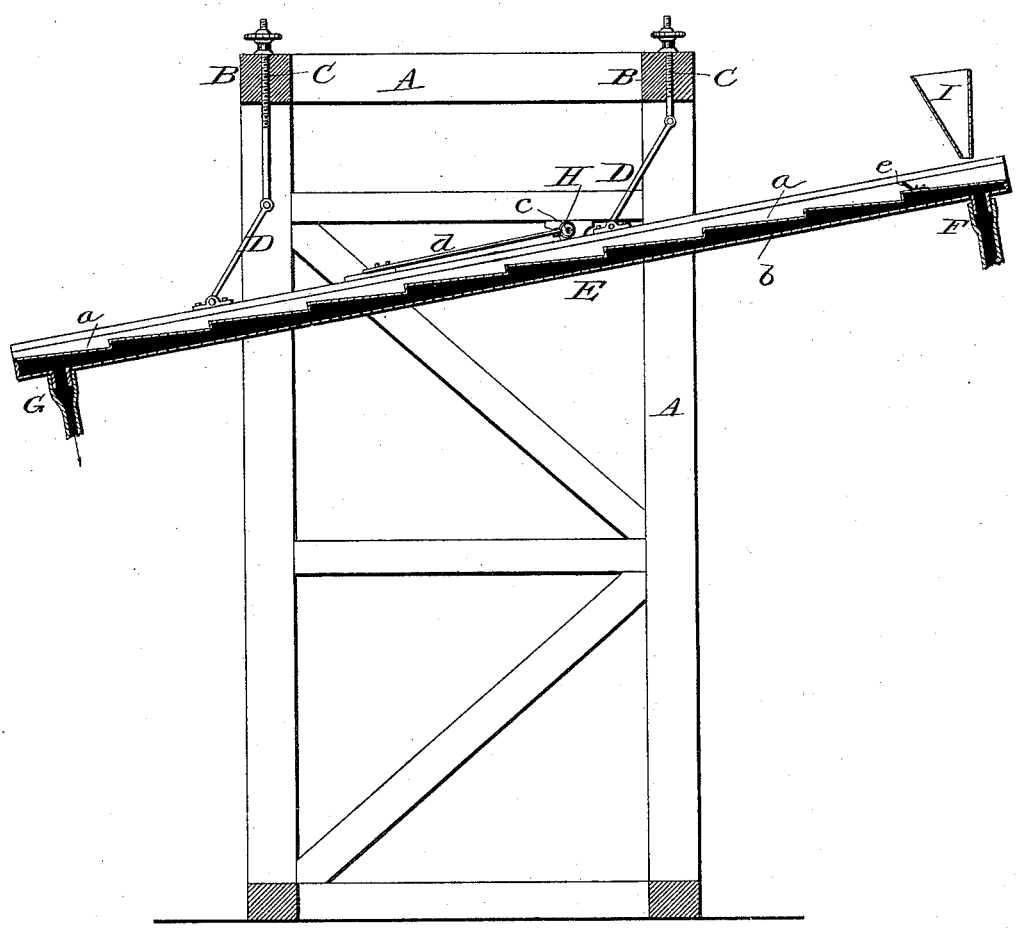
Figure 2:
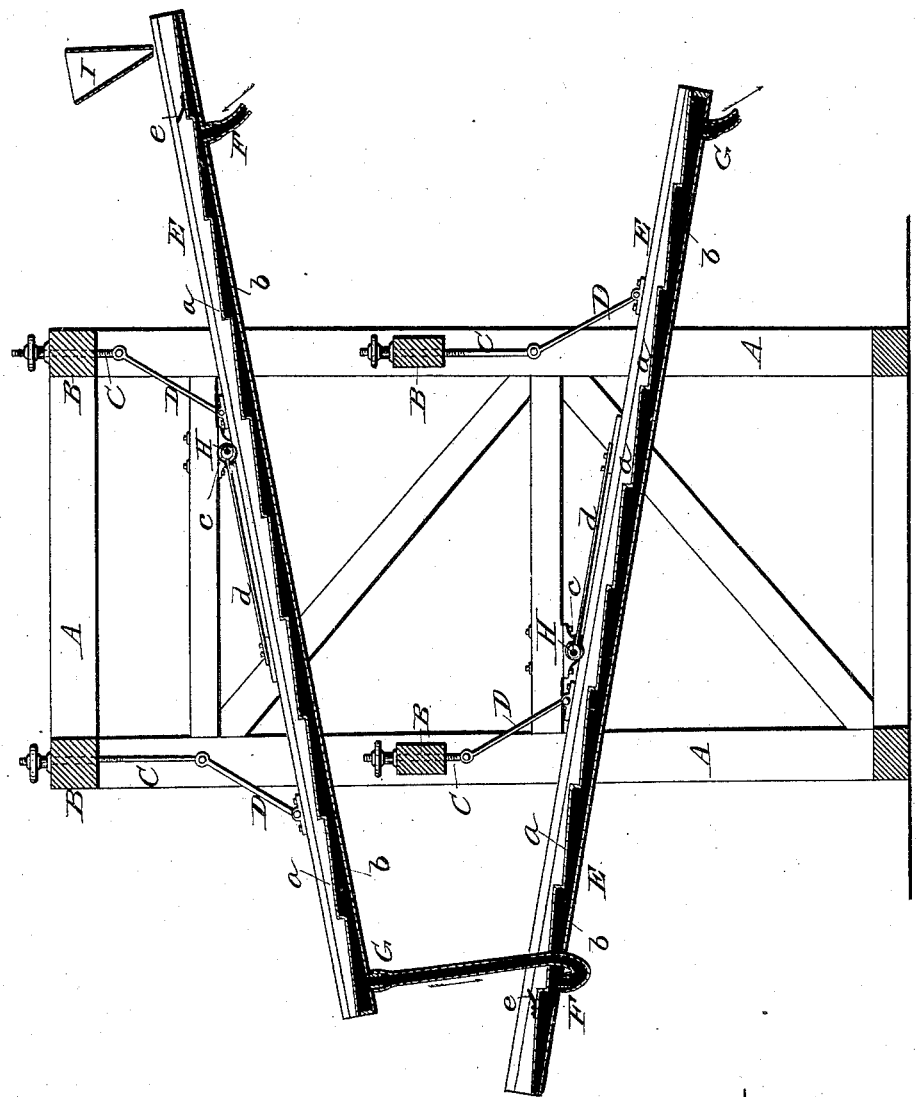

In the drawings hereto annexed, Figure 1 represents a vertical sectional view of a machine constructed in accordance with my invention, and having a single pan; and Fig. 2, a similar view showing two pans, one delivering to the other.

Machines of this class have heretofore been made in a variety of forms, and have embraced in their construction reciprocating steam-jacketed pans; hence I do not broadly claim such pans arranged to be reciprocated and to be heated by steam. By my plan, however, the pan or pans may be varied as desired, to cause the grain to feed more or less rapidly, as required. The surface of the pan is materially increased within a prescribed frame or boundary, and the grain is caused to feed regularly and evenly forward.

Referring again to the drawings, A represents a frame of suitable construction, provided with two cross-beams, B B, through which pass threaded rods or stems C C. To the lower ends of these threaded rods are jointed links D D, carrying at their lower ends a pan, E, suitably framed and constructed, and provided with a corrugated sheet-metal bottom, $a$, beneath which is a steam-space, $b$.

F indicates a steam-inlet, and G an outlet for the waste-steam and the water of condensation, with which exceptions said steam-jacket is tightly closed.

H represents a shaft furnished with a crank or eccentric, $c$, which is connected by a spring arm or bar, $d$, with the frame of pan E, and said shaft is furnished with a band-pulley or other device for receiving motion from any convenient source.

Above the head or elevated end of the pan is a hopper, I, through which grain or other material to be dried is delivered upon the pan.

The apparatus being thus constructed, the operation is as follows: Grain or other material to be dried is supplied to the hopper, and, falling therefrom, is discharged upon the pan, which is caused to swing back and forth rapidly by the rotation of crank $c$, the steam-space $b$ being furnished with steam at suitable temperature through inlet F from a steam generator or supply. The pan is placed in a nearly horizontal position, and the rapid vibration causes it to first pass backward under the grain, leaving the same practically unmoved, except as it falls down in front of the upright faces $e$ of the ledges $f$, then to move forward, whereupon the upright faces $e$ take against the grain and move it forward. In this way the grain is regularly and gradually fed forward, is thoroughly agitated and rolled about, exposing all its faces to the heat of the pan, and is caused to fall from ledge to ledge in a thin stream, which insures evenness of feed and heating. If it be found that the grain is more than usually damp, the head of the pan will be lowered slightly, the tail raised, or both, by turning up or down the screws C C, as will be readily understood. If desired to act upon the grain for a longer time, two pans or a series thereof may be arranged to deliver one to another, being preferably arranged in one and the same frame, and inclined alternately in reverse directions, as in Fig. 2, but all operating in precisely the same manner as the one described.

If desired, a ledge or strip, $e$, may be secured to the bottom $a$, in order to dam up the material and cause the same to flow over the top in an even stream.

Having thus described my invention, what I claim is—

1. The herein-described grain-drier, consisting of a frame, adjustable rods C, links D, pan E, having corrugated steam-jacketed bottom, and means, substantially such as shown and described, for imparting a reciprocating motion to the pan.

2. In combination with the frame and with a pan or grain table of a grain-drying apparatus, suspending-links for said pan, and vertically-adjustable rods carrying said links, whereby the pan may be inclined as required.

BENTLEY S. CULLEN.

Witnesses:
ROBT. H. ROSE,
C. F. WARNER.